(12) United States Patent
Huang

(10) Patent No.: US 12,013,995 B2
(45) Date of Patent: *Jun. 18, 2024

(54) COMPUTER INPUT DEVICE

(71) Applicant: ACCO Brands Corporation, Lake Zurich, IL (US)

(72) Inventor: Yu-Chia Huang, New Taipei (TW)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,973

(22) Filed: Dec. 5, 2022

(65) Prior Publication Data
US 2023/0097043 A1 Mar. 30, 2023

Related U.S. Application Data

(63) Continuation of application No. 16/888,124, filed on May 29, 2020, now Pat. No. 11,531,411.

(51) Int. Cl.
| | | |
|---|---|---|
| G06F 3/0354 | (2013.01) | |
| G06F 3/0362 | (2013.01) | |
| G06F 3/039 | (2013.01) | |

(52) U.S. Cl.
CPC ........ *G06F 3/03549* (2013.01); *G06F 3/0362* (2013.01); *G06F 3/039* (2013.01)

(58) Field of Classification Search
None
See application file for complete search history.

(56) References Cited

U.S. PATENT DOCUMENTS

| | | | |
|---|---|---|---|
| 4,933,670 | A | 6/1990 | Wislocki |
| 5,521,617 | A | 5/1996 | Imai et al. |
| 5,561,445 | A | 10/1996 | Miwa et al. |
| 5,714,982 | A | 2/1998 | Imai et al. |
| D402,281 | S | 12/1998 | Ledbetter et al. |
| 5,850,213 | A | 12/1998 | Imai et al. |
| D409,181 | S | 5/1999 | Edwards et al. |
| D410,638 | S | 6/1999 | Sheehan et al. |

(Continued)

FOREIGN PATENT DOCUMENTS

| | | |
|---|---|---|
| CN | 201465051 U | 5/2010 |
| CN | 202003316 U | 10/2011 |

(Continued)

OTHER PUBLICATIONS

Logitech, "Comfort's New Angle Wireless Trackball," <https://www.logitech.com/en-us/product/mx-ergo-wireless-trackball-mouse> webpage publicly available as early as Nov. 22, 2017 (10 pages).

(Continued)

*Primary Examiner* — Ifedayo B Iluyomade
(74) *Attorney, Agent, or Firm* — Michael Best & Friedrich LLP

(57) ABSTRACT

A computer input device includes a housing having an opening, a ball holder supported relative to the housing and being concentric with the opening, a ball positioned within the ball holder and extending through the opening in the housing, and a scroll ring concentric with and rotatable relative to the ball holder. The ball is movable relative to the ball holder. The ball holder has a track, and the scroll ring has at least one projection received in the track of the ball holder to guide the scroll ring.

20 Claims, 7 Drawing Sheets

(56) References Cited

U.S. PATENT DOCUMENTS

| | | | |
|---|---|---|---|
| D424,548 S | 5/2000 | Edwards et al. | |
| D430,877 S | 9/2000 | Varga et al. | |
| D431,037 S | 9/2000 | Varga et al. | |
| 6,157,369 A | 12/2000 | Merminod et al. | |
| 6,157,370 A | 12/2000 | Kravtin et al. | |
| D436,962 S | 1/2001 | Varga et al. | |
| D438,208 S | 2/2001 | Jones et al. | |
| D438,211 S | 2/2001 | Jones et al. | |
| 6,218,659 B1 | 4/2001 | Bidiville et al. | |
| D442,962 S | 5/2001 | Loughnane et al. | |
| D447,748 S | 9/2001 | Loughnane et al. | |
| D448,380 S | 9/2001 | Sheehan et al. | |
| D449,046 S | 10/2001 | Loughnane et al. | |
| 6,429,848 B2 | 8/2002 | Merminod et al. | |
| D466,121 S | 11/2002 | Von Ilberg et al. | |
| 6,525,714 B1 * | 2/2003 | Varga | G06F 3/0362 345/157 |
| 6,556,150 B1 | 4/2003 | McLoone et al. | |
| 6,788,288 B2 | 9/2004 | Ano | |
| 6,791,534 B2 | 9/2004 | Tada et al. | |
| 7,084,856 B2 | 8/2006 | Huppi | |
| 8,054,292 B1 | 11/2011 | Forde et al. | |
| D667,410 S | 9/2012 | Altaai | |
| D681,039 S | 4/2013 | Altaai | |
| 8,446,366 B2 | 5/2013 | Blandin et al. | |
| 8,599,137 B2 | 12/2013 | Rayner | |
| 8,638,295 B2 | 1/2014 | Bruss et al. | |
| 8,780,044 B2 | 7/2014 | Lee | |
| 8,902,165 B1 | 12/2014 | Pflughaupt | |
| 9,261,986 B2 | 2/2016 | Kumazawa et al. | |
| D950,552 S | 5/2022 | Campbell et al. | |
| D967,822 S | 10/2022 | Campbell et al. | |
| 11,531,411 B2 * | 12/2022 | Huang | G06F 3/0354 |
| 2002/0060663 A1 | 5/2002 | Wang | |
| 2003/0197682 A1 | 10/2003 | Huang | |
| 2007/0083115 A1 | 4/2007 | Lee et al. | |
| 2007/0236479 A1 | 10/2007 | Wang et al. | |
| 2007/0242045 A1 | 10/2007 | Chien et al. | |
| 2007/0254705 A1 | 11/2007 | Griffin et al. | |
| 2007/0259697 A1 | 11/2007 | Griffin et al. | |
| 2009/0079711 A1 | 3/2009 | Monney et al. | |
| 2009/0189861 A1 | 7/2009 | Ledbetter et al. | |
| 2011/0241994 A1 * | 10/2011 | Kumazawa | G06F 3/03549 345/167 |
| 2013/0321272 A1 | 12/2013 | Deng | |
| 2019/0138121 A1 | 5/2019 | Selby et al. | |
| 2021/0157423 A1 | 5/2021 | Campbell et al. | |

FOREIGN PATENT DOCUMENTS

| | | |
|---|---|---|
| DE | 102016215005 A1 | 2/2018 |
| EP | 1847920 A2 | 10/2007 |
| EP | 2090963 A1 | 8/2009 |
| EP | 1973029 B1 | 7/2010 |
| EP | 2261773 B1 | 9/2011 |
| EP | 2040148 B1 | 12/2013 |
| EP | 2360812 B1 | 7/2018 |
| JP | 4050361 B2 | 2/2008 |
| JP | S1548521 | 4/2016 |
| WO | 9202007 A1 | 2/1992 |
| WO | 03007143 A1 | 1/2003 |

OTHER PUBLICATIONS

European Patent Office Extended Search Report and Written Opinion for Application No. 21165501.4 dated Sep. 16, 2021 (9 pages).
European Patent Office. Office Action for Application No. 21165501.4 dated May 9. 2023 (6 pages).

* cited by examiner

COMPUTER INPUT DEVICE

CROSS-REFERENCE TO RELATED APPLICATIONS

This application is a continuation of U.S. application Ser. No. 16/888,124, filed on May 29, 2020, the entire contents of which is incorporated by reference.

FIELD OF THE DISCLOSURE

The present disclosure relates to a computer input device. In particular, the present disclosure relates to a trackball for use with a computer system.

SUMMARY

In one aspect, a computer input device includes a housing having an opening, a ball holder supported relative to the housing and being concentric with the opening, a ball positioned within the ball holder and extending through the opening in the housing, and a scroll ring concentric with and rotatable relative to the ball holder. The ball is movable relative to the ball holder. The ball holder has a track, and the scroll ring has at least one projection received in the track of the ball holder to guide the scroll ring.

In another aspect, a computer input device includes a housing having an opening, a ball supported by and rotatable relative to the housing, a scroll ring concentric with the opening and rotatable about the ball; a controller positioned within the housing and in communication with the ball and the scroll ring to control the movement of a cursor on a computer screen. At least a portion of the ball extends through the opening in the housing. The scroll ring includes a first portion and a second portion formed as a single-piece. The first portion extends through the opening and the second portion is positioned on an exterior of the housing. The first portion has a plurality of slits positioned within the housing. The movement of the scroll ring causes movement of the plurality of slits, and movement of the plurality of slits generates signals that are sent to the controller.

In yet another aspect, a method is disclosed for manufacturing a computer input device. The method includes providing a housing having an opening, positioning a ball support within the housing adjacent the opening, positioning a ball on the ball support within the housing such that a portion of the ball extends through the opening in the housing, securing a ball holder to the ball support to inhibit removal of the ball from the housing, and coupling a scroll ring to the ball holder such that a first end of the scroll ring is positioned in the housing and a portion of the scroll ring opposite the first end is exterior to the housing. The ball holder has a track.

In addition, other aspects of the disclosure will become apparent by consideration of the detailed description and accompanying drawings.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described aspects.

Figure 1:
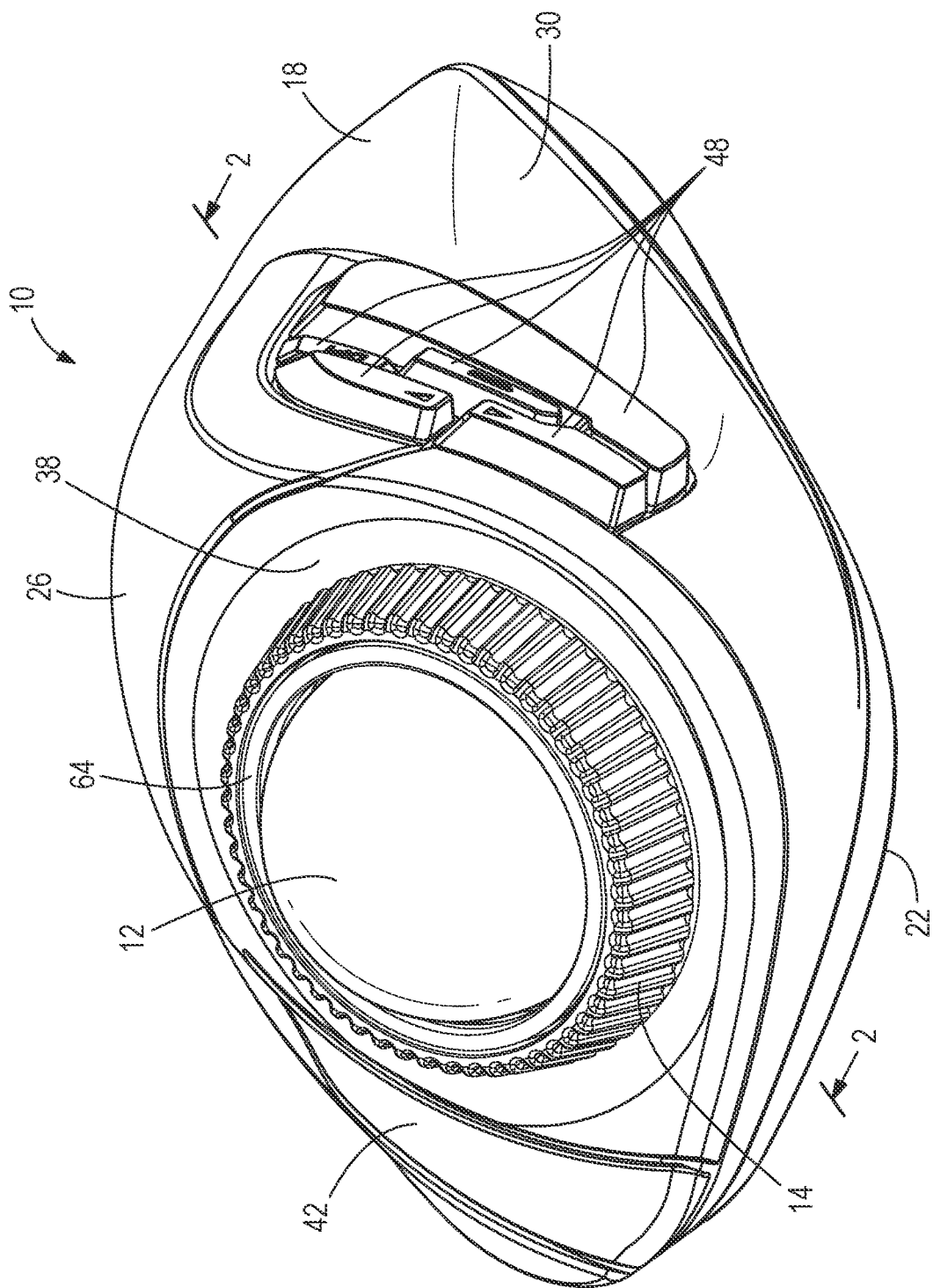
FIG. 1 illustrates a front perspective view of a computer input device according to an embodiment of the invention, the computer input device including a housing, a ball holder, a ball, and a scroll ring.
Figure 2:
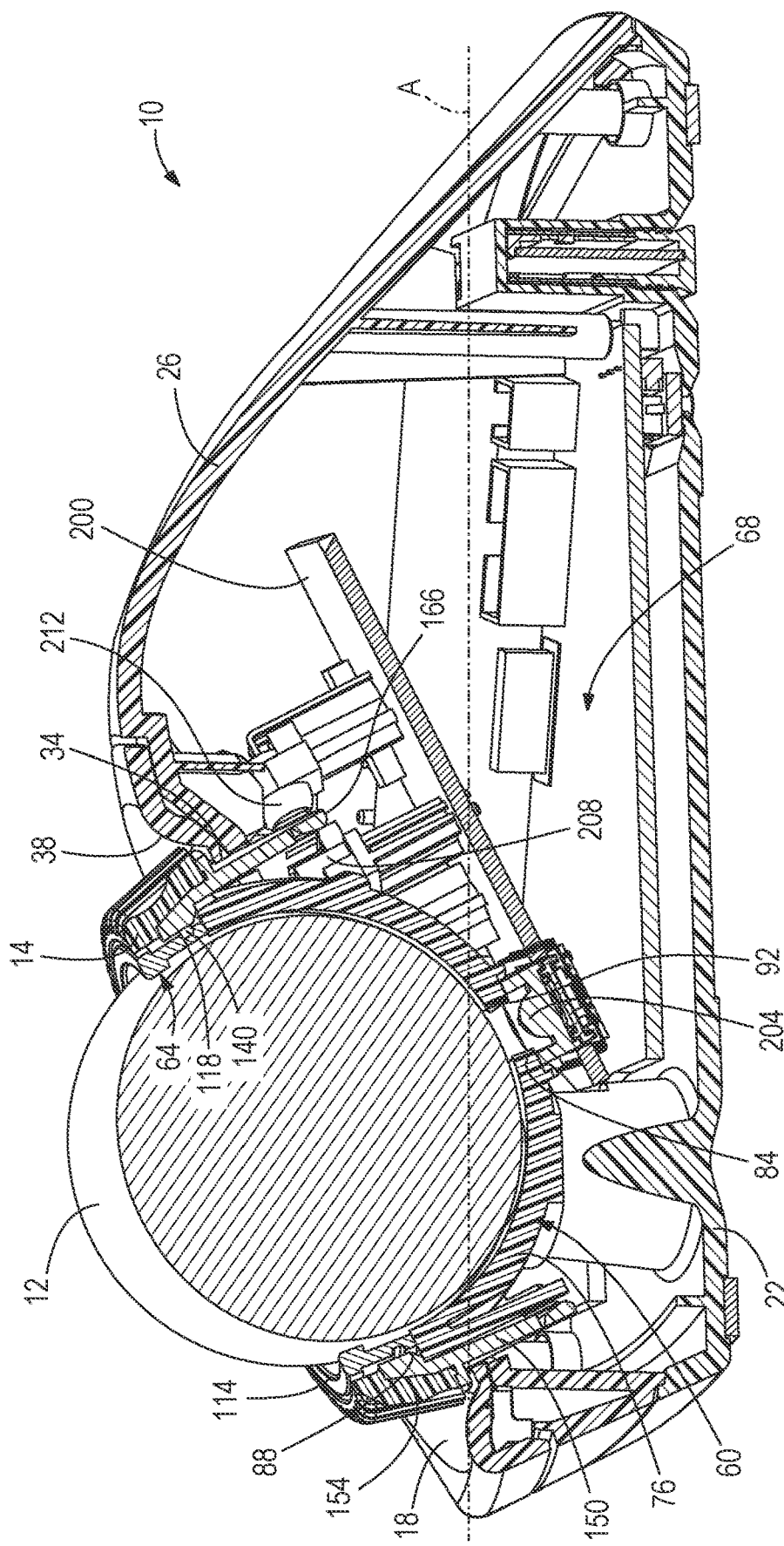
FIG. 2 is a cross-sectional view of the computer input device of claim 1 taken along the line 2-2 of FIG. 1.
Figure 3:
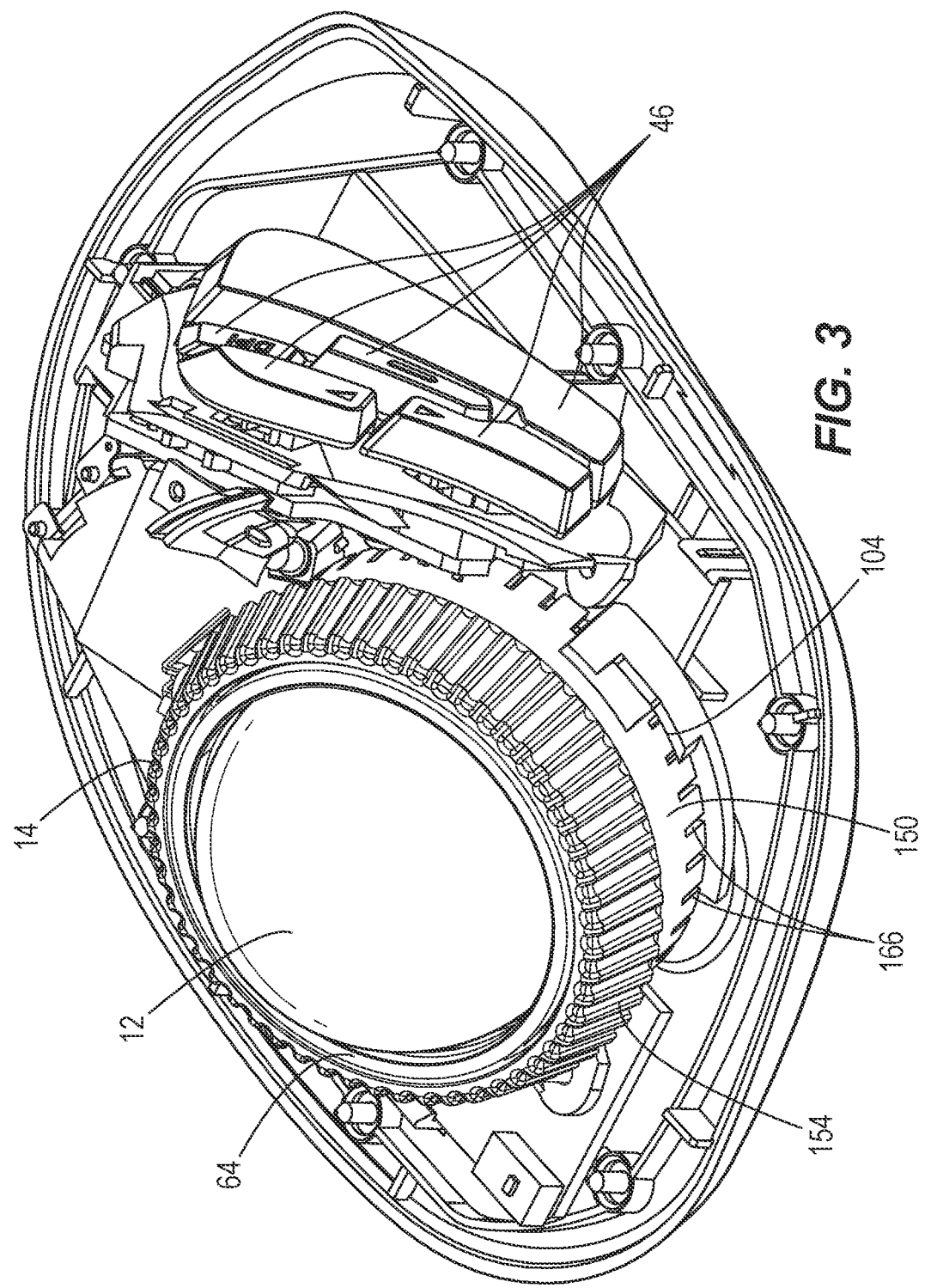
FIG. 3 illustrates another front perspective view of the computer input device of FIG. 1 having a portion of the housing removed.

FIGS. 1-2 illustrate a computer input device 10, which is illustrated as a trackball, that is configured to be used with a computer system. The trackball 10 has a ball 12 and a scroll ring 14 that communicate with a computer screen (not shown) of a computer system. As shown in FIGS. 1 and 2, the trackball 10 includes a housing 18 that has a longitudinal axis A, a first side 22 (e.g., a bottom side), a second side 26 (e.g., a top side), and a third side 30 (e.g., a left side). The longitudinal axis A extends in a fore-aft direction, parallel to the longest dimension of the trackball 10. The top side 26 of the housing 18 defines an arcuate surface. The top side 26 is coupled to the bottom side 22 and the left side 30. The bottom side 22 defines a planar surface. The bottom side 22 supports the trackball 10 on a support surface (e.g., a desk or the like). The housing 18 also includes an opening 34 extending through the top side 26. As shown in FIG. 1, the illustrated housing 18 has a depression 38 in the top side 26, and the opening 34 is positioned within the depression 38. The ball 12 and the scroll ring 14 are at least partially positioned within the housing 18 and extend through the opening 34. The ball 12 and the scroll ring 14 are at least partially supported by and movable (e.g., rotatable) relative to the housing 18.

The trackball 10 includes a first actuator or button 42 (e.g., a "right-click" button) supported on the top side 26 and a plurality of second actuators or buttons 46 supported on the left side 30. The right-click button 42 and the plurality of second buttons 46 are positioned on opposite sides of the trackball 10 and scroll ring 14. The buttons 42, 46 communicate with the screen. The bottom side 22 may include several buttons that are not shown, such as a power switch, a wireless communication button, and a dots per inch (DPI) button. In other embodiments, the trackball 10 may have other types and/or numbers of buttons, and the buttons may be arranged in different configurations on the housing 18.

The top side 26 of the housing 18 is configured to receive a portion of a user's hand, and the left side 30 is configured to receive another portion of the user's hand. In particular, the top side 26 is sized, shaped, and contoured to comfortably support a user's palm and fingers, and the left side 30 is sized, shaped, and contoured to comfortably receive a user's thumb. In other embodiments, the housing 18 may have other shapes and configurations. In addition, the trackball 10 may include other types of actuators and/or the actuators may be located in other positions on the housing 18.

With respect to FIGS. 2-6, the ball 12 is supported by a ball support 60 and a ball holder 64. The ball support 60 is configured to hold the ball 12 in position relative to the opening 34, while the ball holder 64 is configured to inhibit removal of the ball 12 from the opening 34. The ball support 60 is at least partially positioned and supported within an interior 68 (FIG. 2) of the housing 18. The ball support 60 may be secured within the interior of the housing by fasteners (not shown). The ball support 60 is shown in greater detail in FIGS. 5 and 6. The ball support 60 has a body with an arcuately shaped wall 76 that defines a recess 80. The recess has a first or closed end 84 positioned within the interior 68 and a second or open end 88 that is concentric with the opening 34 in the housing 18. In the illustrated embodiment, the open end 88 is positioned exterior to the housing 18, as shown in FIG. 2. In other embodiments, the open end 88 may be positioned within the housing 18 or in the same plane as the opening 34. The closed end 84 includes at least one aperture 92 extending therethrough. An outer surface of the wall 76 includes at least one recess 96 that defines a ledge or groove 100. In the illustrated embodiment, the wall 76 includes a plurality of recesses 96, each defining a groove 100. As shown, the wall 76 includes four recesses 96 having grooves 100 in the illustrated embodiment, but may include more or fewer recesses 96 and grooves 100 in other embodiments.

The ball support 60 also includes an arcuate channel 104 that is coupled to the body. The arcuate channel 104 extends radially outward from the wall 76. In the illustrated embodiment, the arcuate channel 104 extends only partially around a circumference of the ball support 60. The illustrated arcuate channel 104 is also defined by several discrete sections such that the arcuate channel 104 is discontinuous. The arcuate channel 104 receives a portion of the scroll ring 14 to help guide the scroll ring 14.

Figure 5:
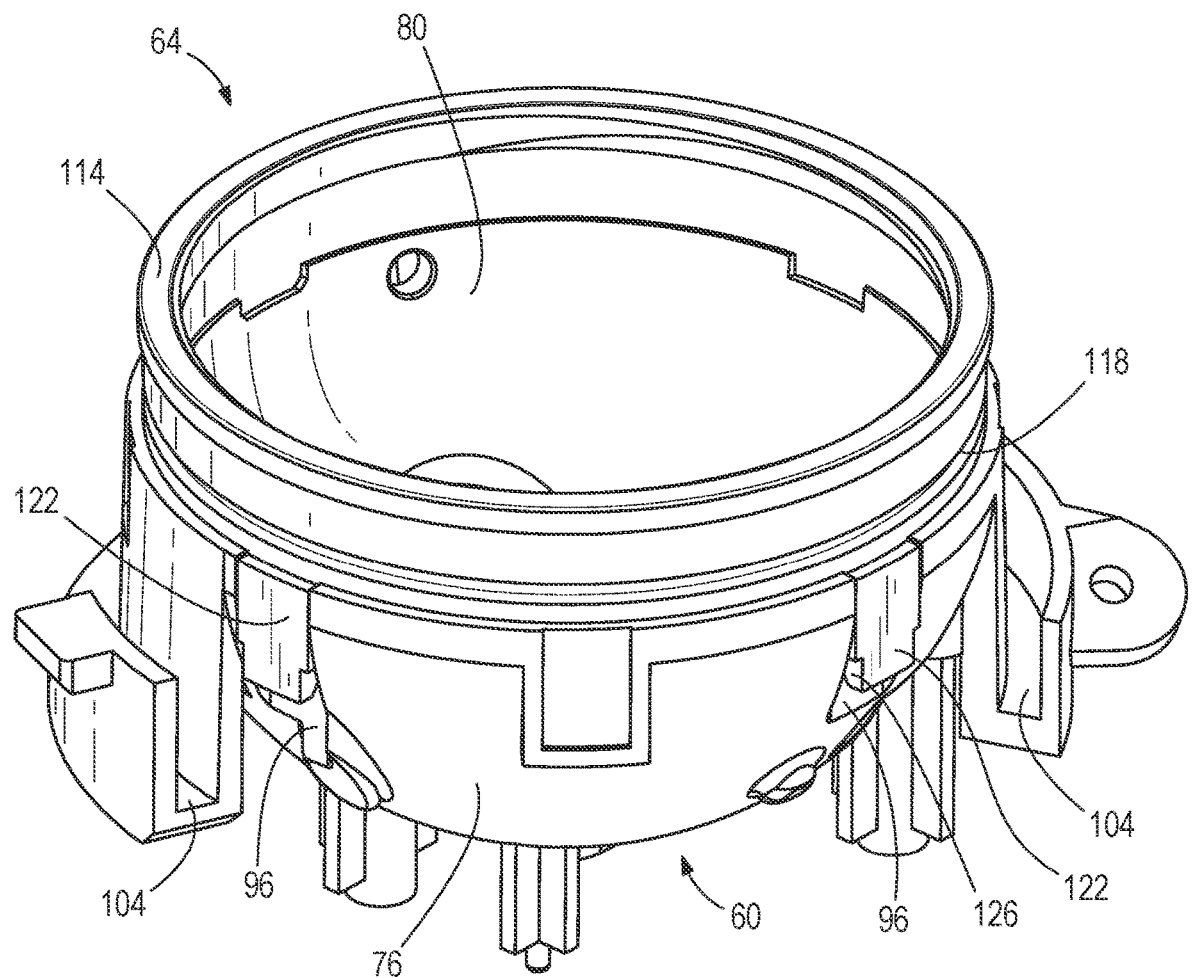
FIG. 5 illustrates a perspective view of the ball holder the computer input device of FIG. 1, the ball holder coupled to a ball support.
Figure 6:
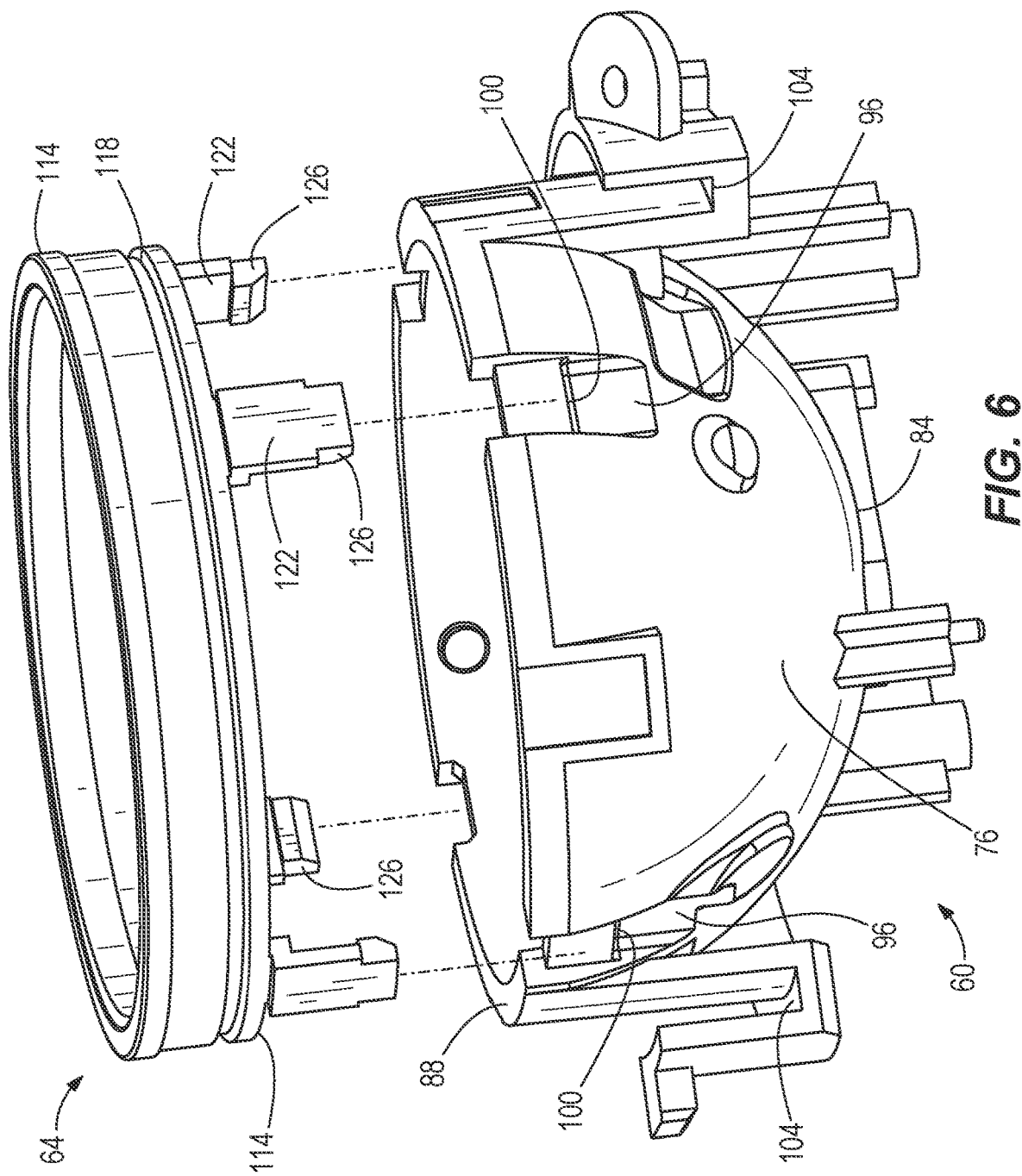
FIG. 6 illustrates an exploded view of the ball holder and the ball support of FIG. 5.
Figure 8:
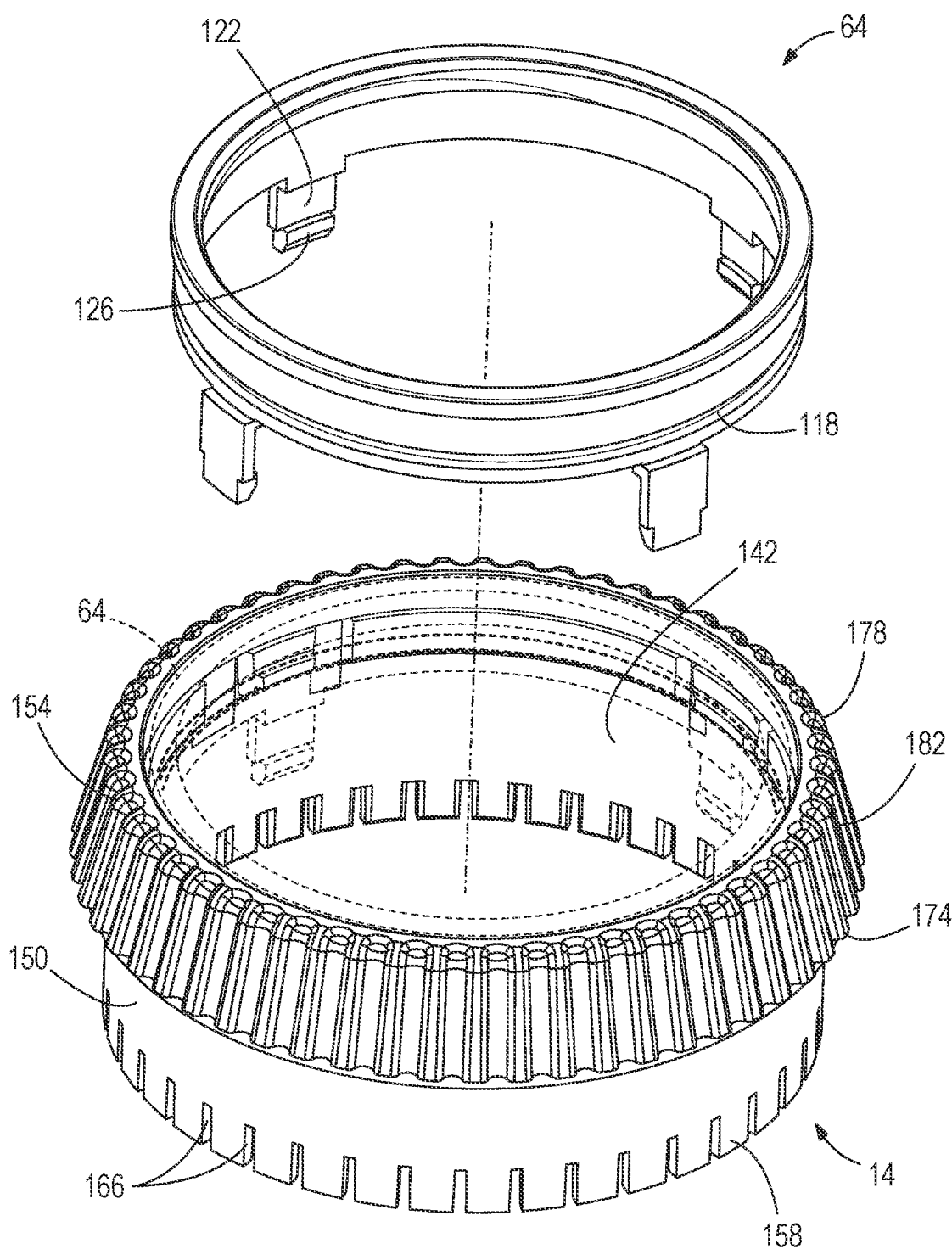
FIG. 8 illustrates an exploded view of the ball holder and the scroll ring of the computer input device of FIG. 1.

Further with respect to FIGS. 5 and 6, the ball holder 64 includes a circular body that is concentric with the opening 34 in the housing 18 and the open end 88 of the ball support 60. The ball holder 64 is at least partially positioned on an exterior of the housing 18. As shown, the ball holder 64 has a first end 110, a second end 114, and a circumferential track 118 positioned between the first and second ends 110, 114 in an outer surface of the body. The track 118 is formed on an exterior of the housing 18. The illustrated track 118 is continuous around the entire circumference of the ball holder 64. At least one projection 122 extends from the first end 110 and includes a hook 126. In the illustrated embodiment, the ball holder 64 includes a plurality of projections 122, each having a hook 126. The ball holder 64 includes four projections 122 having hooks 126 in the illustrated embodiment, but may include more or fewer projections 122 having hooks 126 in other embodiments. Each of the plurality of projections 122 positively engages (e.g., by a snap-fit engagement) one of the recesses 96 in the wall 76 of the ball support 60 to secure the ball holder 64 to the ball support 60. That is, each of the projections 122 is received within the respective recess 96 such that the hook 126 engages (e.g., by snap-fit engagement) the groove 100. In other embodiments, the ball support 60 may include the hooks 126 and the ball holder 64 may include the recesses 96, or the ball support 60 and the ball holder 64 may be coupled together using other suitable means. The closed end 84 of the ball support 60 receives the ball 12 and, together with the ball holder 64, retains the ball 12 within the housing 18.

With respect to FIGS. 2-4 and 7-8, the scroll ring 14 is concentric with the opening 34 in the housing 18 and the ball holder 64. The scroll ring 14 is also rotatable about the ball 12 and the ball holder 64. The scroll ring 14 includes at least one projection 140 extending from an inner surface of a wall 142. The projection 140 is received in the track 118 of the ball holder 64 to guide the scroll ring 14. In the illustrated embodiment, the scroll ring 14 has a plurality of projections 140 extending therefrom. The scroll ring 14 includes four projections 140 in the illustrated embodiment, but may include more or fewer projections 140 in other embodiments. In other embodiment, the scroll ring 14 may include the track 118 and the ball holder 64 may include one or more projections 140 that are received in the track 118.

The scroll ring 14 includes a first portion 150 and a second portion 154 that are integrally formed as a single-piece. In the illustrated embodiment, the first and second portions 150, 154 are formed as a single-piece using a double injection molding process. The second portion 154 is concentric with the first portion 150. The first portion 150 is formed from a first material, and the second portion 154 is formed from a second material that is different than the first material. The first material is more rigid and less elastic than the second material. In the illustrated embodiment, the first material is, for example, thermoplastic elastomer (TPE) and the second material is, for example, nylon. Other suitable first and second materials may be used in other embodiments as long as the second material is more elastic and less rigid than the first material.

The wall 142 of the first portion 150 is cylindrical and has a first or lower end 158 and a second or upper end 162 opposite the first end 158. A plurality of slits 166 are positioned at the first end 158. The projections 140 are positioned adjacent the second end 162. A pair of cut-outs 170 in the wall 142 (FIG. 7) are positioned on opposite sides of each projection 140.

The second portion 154 includes a first or lower end 174, a second or upper end 178 opposite the first end 174, and a gripping surface 182 extending between the first and second ends 174, 178. The first end 174 of the second portion 154 is positioned between the first end 158 of the first portion 150 and the second end 162 of the first portion 150. The second end 178 of the second portion 154 is positioned adjacent to the second end 162 of the first portion 150. During molding, the second material of the second portion 154 is received in and coupled to the cut-outs 170, securing the first and second portions 150, 154 together as a single-piece. As shown, the second portion 154 has a conical shape. That is, the first end 174 defines a larger dimension (e.g., diameter) than the second end 178.

The first portion 150 extends through the opening 34 in the housing 18. The first end 158 of the first portion 150 is positioned on a first side of the opening 34 within the interior 68 the housing 18, while the second end 162 of the first portion 150 is positioned on a second side of the opening 34 exterior to the housing 18. The second portion 154 is positioned on an exterior of the housing 18. The second end 162 of the first portion 150 and the second portion 154 are concentric with the ball holder 64. As shown and noted above, the projections 140 of the first portion are positioned in and movable within the track 118 of the ball support 60 such that the track 118 guides the projections 140 of the scroll ring 14.

Figure 4:
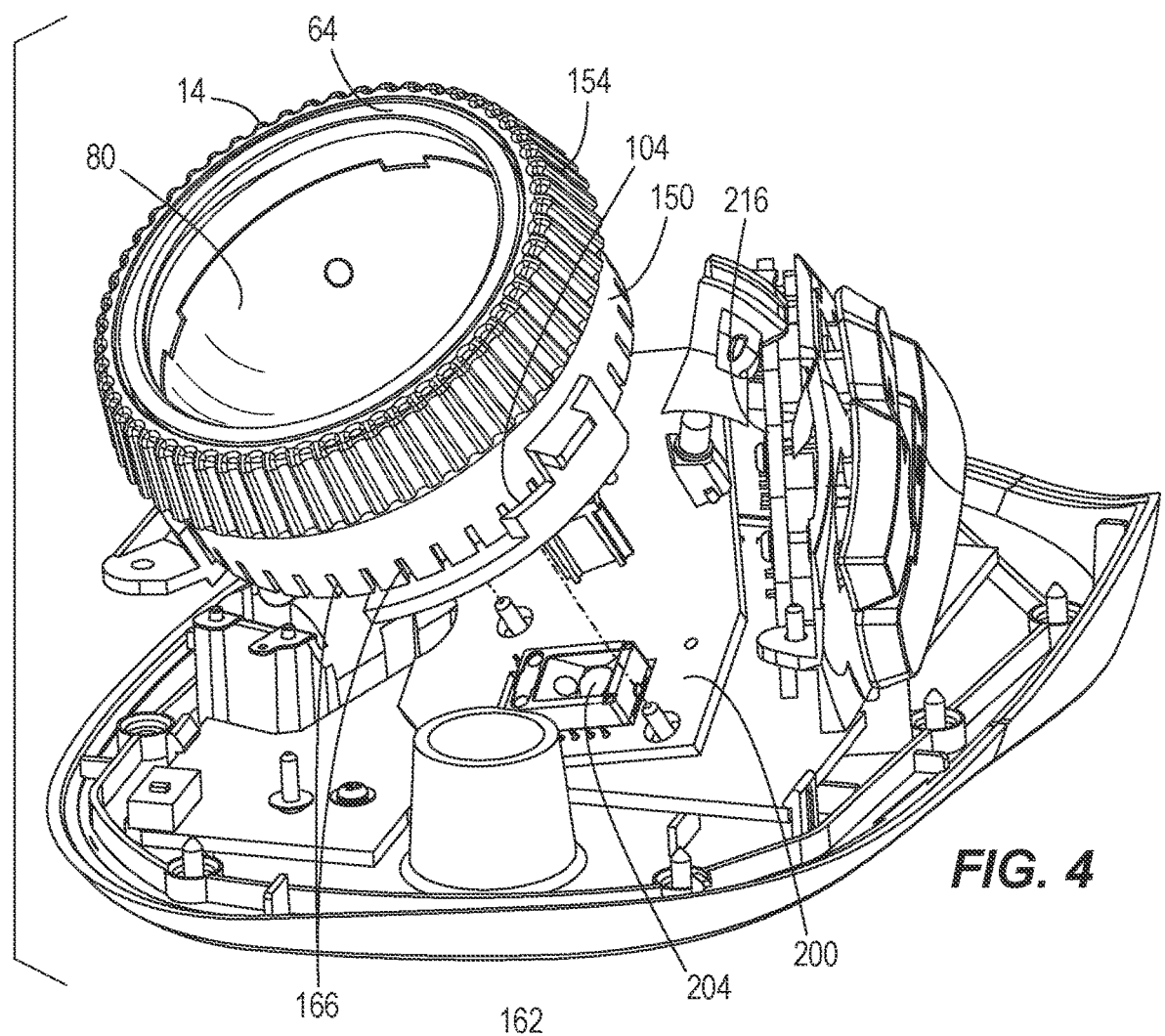
FIG. 4 illustrates a partially exploded view of the computer input device of FIG. 1.
Figure 7:
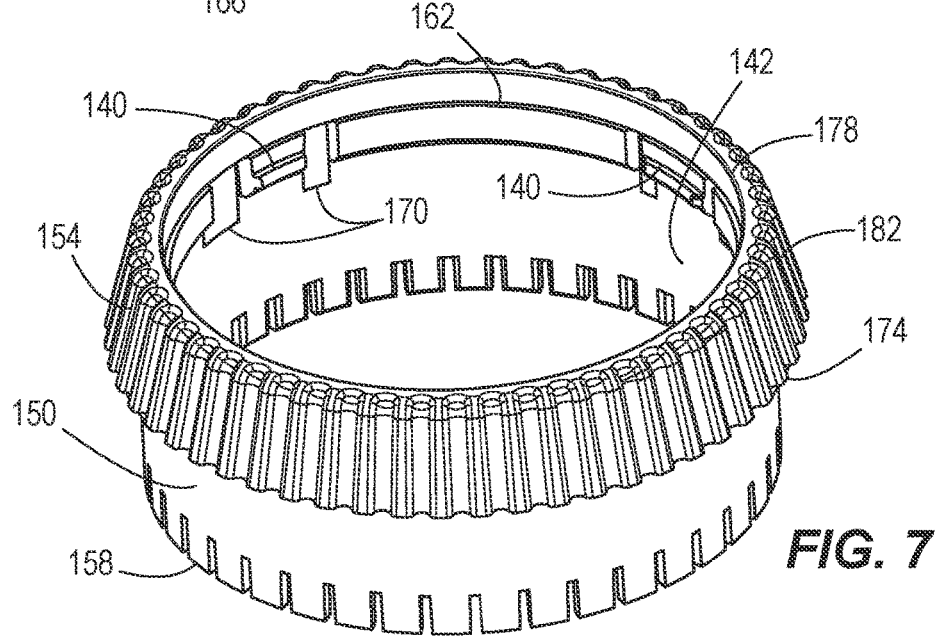
FIG. 7 illustrates a perspective view of the scroll ring of the computer input device of FIG. 1.

With respect to FIGS. 2 and 4, the trackball 10 includes printed circuit board 200 and a power source (not shown). In the illustrated embodiment, the power source comprises one or more batteries that power the trackball 10. The batteries are removable from the housing 18 and replaceable via an aperture (not shown) that extends through the bottom side 22. The aperture is selectively closed by a cover (not shown) coupled to the bottom side 22. In additional or alternative embodiment, the trackball 10 may be powered by a cord that is coupled to and extends between the housing 18 and an input port of the computer system. The printed circuit board 200 allows communication between the trackball 10 and the computer system. For example, the printed circuit board 200 may include a chip for wirelessly communicating with the computer system via Bluetooth® or other suitable wireless protocols. With respect to FIG. 2, mounted to the printed circuit board 200 is a plurality of sensors 204, 208 and a light 212 that are in communication with a controller 216 (FIG. 4).

The controller is in communication with the ball 12 and the scroll ring 14 via the plurality of sensors 204, 208 to control content on the screen of the computer system. A first sensor 204 of the plurality of sensors is, for example, an optical sensor that senses movement of the trackball 10. The optical sensor 204 is aligned with and received in the aperture 92 of the ball support 60. Movement of the trackball 10 sensed by the optical sensor 204 results in movement of a cursor on a screen of the computer monitor. A second sensor 208 of the plurality of sensors is, for example, an infrared (IR) detector that measures or detects infrared light emitted from the light 212, which is an infrared (IR) light. As shown, the first end 158 of the first portion of the scroll ring 14 having the plurality of slits 166 is positioned between the IR detector 208 and the IR light 212. As the scroll ring 14 is moved or rotated, the slits 166 move relative to the IR detector 208 and the IR light 212 such that light either moves through one of the plurality of slits 166 or is blocked by the first portion 150 of the scroll ring 14 between adjacent slits 166. The light pulses detected by the IR detector 208 determines the speed at which the content on the screen is able to scroll. For example, the speed of rotation of the scroll ring 14 determines the rate of detection of light pulses by the IR detector 208. Faster rates of detection of light pulses results in the content on the screen moving faster than if the rates of the detection of light pulses are slower. The light pulses detected by the IR detector 208, together with software of the controller 216, also determine the direction (e.g., up and down) the content shown on the screen is moving.

In operation, the user can manipulate (e.g., rotate) the ball 12 to move the cursor in any direction on the screen of the monitor. The user can rotate the scroll ring 14 in a first direction (e.g., clockwise) to move the content on the screen in a first direction (e.g., scroll down) and can rotate the scroll ring 14 a second, opposite direction (e.g., counterclockwise) to move the content on the screen in a second direction (e.g., scroll up).

The trackball 10 is manufactured by forming the scroll ring 14 as a single-piece using double injection molding. That is, the scroll ring 14 is manufactured by using a single mold to form the first portion 150 from the first material, and to form the second portion 154 from the second material. Specifically, a first injector system (not shown) can be used to selectively inject the first material into the mold and a second injector system (now shown) can be used to selectively inject the second material into the mold. In some embodiments, during the molding process, the second portion 154 is formed after the first portion 150 is formed, and the second portion 154 is coupled to the first portion 150 by introducing the second material into the cut-outs 170 on either side of each of the projections 140.

The trackball 10 is further manufactured by positioning the scroll ring 14 relative to the housing 18, and specifically, relative to the opening 34 in the housing 18 that receives the ball 12. To this end, the ball support 60 is positioned within the housing 18 adjacent the opening 34. That is, the ball support 60 is secured to the housing 18 by fasteners or the like. The ball 12 is positioned on the ball support 60 within the housing 18 such that a portion of the ball 12 extends through the opening 34 in the housing 18. Specifically, the ball 12 is positioned or seated within the recess 80 of the ball support such that it is able to communicate with the optical sensor 204. To secure the ball relative to the ball support 60, and therefore the housing 18, the ball holder 64 is secured to the ball support 60. As discussed above, the ball holder 64 is secured to the ball support 64 by snap-fit engagement such that ball holder 64 positively engages or snaps onto the ball support 60. The scroll ring 14 is positioned relative to the opening 34 and coupled to the ball holder 34. That is, the first end 158 of the first portion 150 of the scroll ring 14 is positioned in the housing 18 and a portion of the scroll ring 14 opposite the first end 158 is exterior to the housing 34. As discussed above, the second end 162 of the first portion 150 and the second portion 154 are positioned exterior to the housing 18. The first end 158 is positioned relative to the channel 104 of the ball support 60. The channel 104 assists in properly positioning the first end 158 of the scroll ring 14, and therefore the plurality of slits 166, relative to the IR detector 208 and the IR light 212 so that the plurality of slits 166 are operable with the controller 216. The scroll ring 14 is coupled to the ball holder 64 by positioning the projection 140 (or projections 140) within the track 118. Engagement between the projection 140 and the track 118 allows the scroll ring 14 to rotate about the ball holder 64 and the ball 12 thereby moving the slits 166 relative to the IR detector 208 and the IR light 212, which enables communication with the computer screen, as discussed above.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. A computer input device comprising:
a housing having an opening;
a ball holder supported relative to the housing and being concentric with the opening, the ball holder having a track;
a ball positioned within the ball holder and extending through the opening in the housing, the ball movable relative to the ball holder; and
a scroll ring surrounding the ball holder and rotatable relative to the ball holder, the scroll ring having a first end and a second end opposite the first end, the first end positioned within the housing and the second end being exterior to the housing, the scroll ring having at least one projection received in the track of the ball holder to rotatably couple the scroll ring to the ball holder and guide the scroll ring about the ball holder, the projection being positioned between the first end and the second end;

wherein the ball holder is configured to inhibit removal of the ball from the housing through the opening.

2. The computer input device of claim 1, further comprising a controller positioned within the housing and in communication with the ball and the scroll ring to control the movement of a cursor on a computer screen.

3. The computer input device of claim 1, further comprising a ball support at least partially positioned within the housing, wherein the ball holder is coupled to the ball support.

4. The computer input device of claim 3, wherein the ball support defines a channel that receives and guides a portion of the scroll ring.

5. The computer input device of claim 3, wherein the ball support including a recess having a groove and the ball holder includes a hook, the hook being received within the groove to secure the ball holder relative to the ball support.

6. The computer input device of claim 1, wherein the scroll ring includes a first portion and a second portion formed as a single-piece, the first portion extending through the opening, and the second portion being positioned on an exterior of the housing.

7. The computer input device of claim 6, wherein the first portion extends from the first end towards the second end such that the first portion is positioned on both a first side of the opening within the housing and a second side of the opening exterior to the housing.

8. The computer input device of claim 7, wherein a plurality of slits is positioned at the first end of the first portion, and the at least one projection is positioned adjacent the second end of the first portion.

9. The computer input device of claim 6, wherein the first portion is constructed from a first material, the second portion is constructed from a second material that is different that the first material, and the first material is more rigid than the second material.

10. The computer input device of claim 1, wherein the scroll ring includes a plurality of slits at the first end.

11. A computer input device comprising: a housing having an opening; a ball support positioned within the housing; a ball partially received in the ball support and extending through the opening in the housing, the ball being movable relative to the ball support; a ball holder coupled to the ball support and being concentric with the opening, the ball holder configured to inhibit removal of the ball from the ball support through the opening; and a scroll ring surrounding and being rotatable about the support and the ball holder, the scroll ring including a first portion including a cylindrical wall that extends about an outer perimeter of the ball holder and the ball support and defines a first end of the scroll ring being positioned within the housing, and a second portion being positioned on an exterior of the housing and defining a second end of the scroll ring, wherein the cylindrical wall of the scroll ring is positioned exterior to the ball support and the ball holder such that the cylindrical wall extends about a location at which the ball holder and the ball support are coupled.

12. The computer input device of claim 11, wherein at least a portion of the ball holder is positioned exterior to the housing.

13. The computer input device of claim 11, wherein the scroll ring includes a projection extending therefrom, wherein the ball holder has a track, and wherein the track receives the projection to guide the scroll ring circumferentially about the ball holder.

14. The computer input device of claim 11, wherein the scroll ring includes a first end positioned within the housing, a second end positioned outside the housing, and a plurality of slits at the first end.

15. The computer input device of claim 14, wherein the scroll ring is supported relative to the ball holder at a location between the first end and the second end.

16. The computer input device of claim 14, wherein a projection extends from the scroll ring and is positioned between the first end and the second end, wherein the ball holder has a track, and wherein the track receives the projection to guide the scroll ring circumferentially about the ball holder.

17. The computer input device of claim 16, wherein the projection and the track are positioned outside the housing.

18. A computer input device comprising:
a housing having an opening;
a ball holder supported relative to the housing and being concentric with the opening, the ball holder having a track positioned exterior to the housing;
a ball positioned within the ball holder and extending through the opening in the housing, the ball movable relative to the ball holder; and
a scroll ring concentric with and rotatable relative to the ball holder, the scroll ring having at least one projection received in the track of the ball holder to guide the scroll ring,
wherein the ball holder is configured to inhibit removal of the ball from the housing through the opening.

19. The computer input device of claim 18, wherein the scroll ring has a first end and a second opposite the first end, the first end positioned within the housing and the second end being exterior to the housing, and wherein the projection is positioned between the first end and the second end.

20. The computer input device of claim 19, wherein the scroll ring includes a plurality of slits at the first end.

* * * * *